(12) United States Patent
Chen et al.

(10) Patent No.: US 9,285,924 B2
(45) Date of Patent: Mar. 15, 2016

(54) INFORMATION PROCESSING METHOD AND ELECTRONIC DEVICE

(71) Applicant: Lenovo (Beijing) Co., Ltd., Beijing (CN)

(72) Inventors: Shi Chen, Beijing (CN); Binbin Wei, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 99 days.

(21) Appl. No.: 14/104,306

(22) Filed: Dec. 12, 2013

(65) Prior Publication Data

US 2014/0168166 A1 Jun. 19, 2014

(30) Foreign Application Priority Data

Dec. 19, 2012 (CN) .......................... 2012 1 0553502

(51) Int. Cl.
*G06F 3/042* (2006.01)
(52) U.S. Cl.
CPC ...................................... *G06F 3/042* (2013.01)
(58) Field of Classification Search
CPC combination set(s) only.
See application file for complete search history.

(56) References Cited

U.S. PATENT DOCUMENTS

| | | | | |
|---|---|---|---|---|
| 7,552,402 | B2 * | 6/2009 | Bilow | ........................... 715/862 |
| 8,605,057 | B2 * | 12/2013 | Yang | ...................... G06F 3/042 |
| | | | | 178/18.09 |
| 8,669,955 | B2 * | 3/2014 | Nishio et al. | .................. 345/173 |
| 8,677,232 | B2 * | 3/2014 | Weeldreyer et al. | .......... 715/234 |
| 8,711,265 | B2 * | 4/2014 | Kawamura et al. | ...... 348/333.02 |
| 8,717,381 | B2 * | 5/2014 | Hayward et al. | .............. 345/619 |
| 8,773,429 | B2 * | 7/2014 | Hsu | ............................... 345/419 |

\* cited by examiner

*Primary Examiner* — Van Chow
(74) *Attorney, Agent, or Firm* — Harness, Dickey & Pierce, P.L.C.

(57) ABSTRACT

An information processing method and an electronic device are disclosed. The method is applied to an electronic device, the electronic device includes a display unit and a detection unit, and the detection unit can detect at least an operating body having a distance from a surface of the display unit within a predetermined space range. The method includes: detecting whether there is a first operating body within a predetermined space range, and generating a detection result; acquiring first operating information corresponding to the first operating body if the detection result indicates that there is the first operating body within the predetermined space range; generating an adjustment instruction based on the first operating information; and adjusting a display parameter of the first display object based on the adjustment instruction.

15 Claims, 4 Drawing Sheets

INFORMATION PROCESSING METHOD AND ELECTRONIC DEVICE

This application claims the priority to Chinese Patent Application No. 201210553502.8, entitled "INFORMATION PROCESSING METHOD AND ELECTRONIC DEVICE", filed with the Chinese State Intellectual Property Office on Dec. 19, 2012, which is incorporated by reference in its entirety herein.

FIELD

The disclosure relates to the field of electronic technology, and particularly to an information processing method and an electronic device.

BACKGROUND

Electronic technology is rapidly developed with the development of science and technology. There are more and more types of electronic products and people enjoy conveniences brought by the development of science and technology. People can enjoy a comfortable life brought by the development of science and technology by using various electronic devices.

For example, the existing large screen device can provide a large operating region for users, thus the users can perform operations on wide screen and operate more conveniently.

During practicing the disclosure, the inventor found the following technical problems or drawbacks in the prior art:

multiple display objects may be displayed on the large screen device in the prior art, but display parameters of the display objects are fixed, therefore, the display parameters of the display objects can not be adjusted by the electronic device according to the position of the operating body above the display unit and the display parameters of the display objects can only be adjusted by user's touch operations, which results in a single displaying mode of the electronic device and a poor display effect.

SUMMARY

An information processing method and an electronic device are provided by the present disclosure, for solving the technical problem in the prior art that the electronic device can not adjust the display parameters of the display objects according to the position of the operating body above the display unit, but can only adjust the display parameters of the display objects by user's touch operations. The specific technical solutions are as follows.

An information processing method is applied to an electronic device, the electronic device includes a display unit and a detection unit, the detection unit is adapted to detect at least an operating body which has a distance from a surface of the display unit within a predetermined space range, the method includes:

detecting, when at least a first display object is displayed on the display unit, whether there is a first operating body within the predetermined space range, and generating a detection result;

acquiring first operating information corresponding to the first operating body if the detection result indicates that there is the first operating body within the predetermined space range;

generating an adjustment instruction based on the first operating information; and adjusting a display parameter of the first display object based on the adjustment instruction.

Optionally, the adjusting a display parameter of the first display object based on the adjustment instruction includes:

adjusting the first display object from a current first display position to a second display position which is different from the first display position based on the adjustment instruction; and/or adjusting the first display object from a first display state to a second display state based on the adjustment instruction.

Optionally, the generating an adjustment instruction based on the first operating information includes:

analyzing the first operating information and acquiring motion track parameter information of the operating body from the first operating information; and generating the adjustment instruction based on the motion track parameter information of the operating body.

Optionally, the method further includes, before the generating the adjustment instruction based on the motion track parameter information of the operating body, determining a motion direction of the operating body based on the motion track parameter information of the operating body; and determining the first display object in the motion direction as an object to be adjusted based on the motion direction.

Optionally, the adjusting the first display object from a current first display position to a second display position which is different from the first display position based on the adjustment instruction includes:

acquiring, from the motion track parameter information of the operating body, first start position information which indicates motion of the operating body;

judging whether first final position information satisfies a preset condition, and generating a judgment result;

determining a projection position of the first final position on the display unit as the second display position if the judgment result indicates that the first final position information satisfies the preset condition; and adjusting the first display object from the current first display position to the second display position which is different from the first display position based on the second display position, and/or, the adjusting the first display object from a first display state to a second display state based on the adjustment instruction includes:

acquiring, from the motion track parameter information of the operating body, first start position information which indicates motion of the operating body;

determining a first display edge of the display unit corresponding to the operating body based on the first start position information; and adjusting the first display object from the first display state to the second display state based on the first display edge.

Optionally, the adjusting the first display object from the first display state to the second display state based on the first display edge includes:

determining, based on the first display edge, a direction which is perpendicular to the first display edge and points to a center of the display unit as a first positive display direction; and adjusting the first display object from a current display direction to the first positive display direction based on the first positive display direction.

Optionally, the method further includes, before the generating an adjustment instruction based on the first operating information, analyzing the first operating information, and acquiring static position information of the operating body from the first operating information;

acquiring second start position information and second final position information of the operating body based on the static position information;

acquiring an included angle between the operating body and an edge of the display unit by analyzing based on the second start position information and the second final position information;

determining pointing information of the operating body with respect to the display unit based on the included angle; and determining the first display object on the display unit based on the pointing information.

Optionally, the adjusting the first display object from a current first display position to a second display position which is different from the first display position based on the adjustment instruction includes:

determining a projection position of the second final position on the display unit as the second display position based on the second final position information; and adjusting the first display object from the current first display position to the second display position which is different from the first display position based on the second display position, and/or, the adjusting the first display object from a first display state to a second display state based on the adjustment instruction includes:

determining a second display edge of the display unit corresponding to the operating body based on the second start position information; and adjusting the first display object from the first display state to the second display state based on the second display edge.

Optionally, the adjusting the first display object from the first display state to the second display state based on the second display edge includes:

determining, based on the second display edge, a direction which is perpendicular to the second display edge and points to a center of the display unit as a second positive display direction; and adjusting the first display object from a current display direction to the second positive display direction based on the second positive display direction.

Optionally, the adjusting the first display object from a current first display position to a second display position which is different from the first display position includes:

determining a display distance between the first display position and the second display position;

determining N temporary display positions in the display distance based on a preset rule, where N is a positive integer greater than or equal to 1; and displaying the first display object from the first display position to the second display position step by step by means of the N temporary display positions.

An electronic device includes:

a display unit, adapted to display at least one display object;

a detection unit, adapted to detect, when at least a first display object is displayed on the display unit, whether there is a first operating body within a predetermined space range, and generate a detection result;

an acquisition unit, adapted to acquire first operating information corresponding to the first operating body if the detection result indicates that there is the first operating body within the predetermined space range;

an instruction generation unit, adapted to generate an adjustment instruction based on the first operating information; and an adjustment unit, adapted to adjust a display parameter of the first display object based on the adjustment instruction.

Optionally, the adjustment unit is adapted to adjust the first display object from a current first display position to a second display position which is different from the first display position based on the adjustment instruction; and/or adjust the first display object from a first display state to a second display state based on the adjustment instruction.

Optionally, the instruction generation unit includes:

an analysis module, adapted to analyze the first operating information and acquire motion track parameter information of the operating body from the first operating information; and an instruction generation module, adapted to generate the adjustment instruction based on the motion track parameter information of the operating body.

Optionally, the electronic device further includes:

a direction determination unit, adapted to determine a motion direction of the operating body based on the motion track parameter information of the operating body; and a display object determination unit, adapted to determine the first display object in the motion direction as an object to be adjusted based on the motion direction.

Optionally, the adjustment unit includes:

a first acquisition module, adapted to acquire, from the motion track parameter information of the operating body, first start position information which indicates motion of the operating body;

a judgment module, adapted to judge whether first final position information satisfies a preset condition and generate a judgment result;

a first determination module, adapted to determine a projection position of the first final position on the display unit as a second display position if the judgment result indicates that the first final position information satisfies the preset condition;

a first adjustment module, adapted to adjust the first display object from the current first display position to the second display position which is different from the first display position based on the second display position, and/or, the adjustment unit includes:

a second acquisition module, adapted to acquire, from the motion track parameter information of the operating body, first start position information which indicates motion of the operating body;

a second determination module, adapted to determine a first display edge of the display unit corresponding to the operating body based on the first start position information; and a second adjustment module, adapted to adjust the first display object from the first display state to the second display state based on the first display edge.

In the embodiments of the disclosure, the operating body within a preset range above the electronic device is detected by using a self-capacitance detection apparatus, that is, without the operating body contacting the electronic device, the electronic device can determine a display object to be adjusted by acquiring position information of the operating body with respect to the display unit, and adjust the display position and the display direction of the display object based on the position information. Therefore, it is solved the technical problem in the prior art that the electronic device can not adjust the display parameters of the display objects according to the position of the operating body above the display unit but can only adjust the display parameters of the display objects by user's touch operations. The electronic device can adjust the position of the display object by sensing the operating body above the electronic device, which provides additional adjusting modes for the display object of the electronic device, simplifies processing of the display object of the electronic device and user's operation, enables the user to operate more conveniently and improves user's experience.

DETAILED DESCRIPTION

An information processing method and an electronic device are provided by the present disclosure. The method is applied to an electronic device, the electronic device includes a display unit and a detection unit, and the detection unit can detect at least an operating body having a distance from a surface of the display unit within a predetermined space range. The method includes: detecting, when at least a first display object is displayed on the display unit, whether there is a first operating body within a predetermined space range, and generating a detection result; acquiring first operating information corresponding to the first operating body if the detection result indicates that there is the first operating body within the predetermined space range; generating an adjustment instruction based on the first operating information; and adjusting a display parameter of the first display object based on the adjustment instruction. Therefore, it is solved the technical problem in the prior art that the electronic device can not adjust the display parameters of the display object according to the position of the operating body above the display unit but can only adjust the display parameters of the display object by user's touch operations.

The technical solutions of the disclosure are described in detail below by the drawings and specific embodiments. It should be understood that, embodiments of the disclosure and specific technical features therein are merely used to describe the technical solutions of the disclosure in detail, rather than limiting the technical solution, and the embodiments of the disclosure and the specific technical features therein may be combined with each other if there is no conflict.

Figure 1:
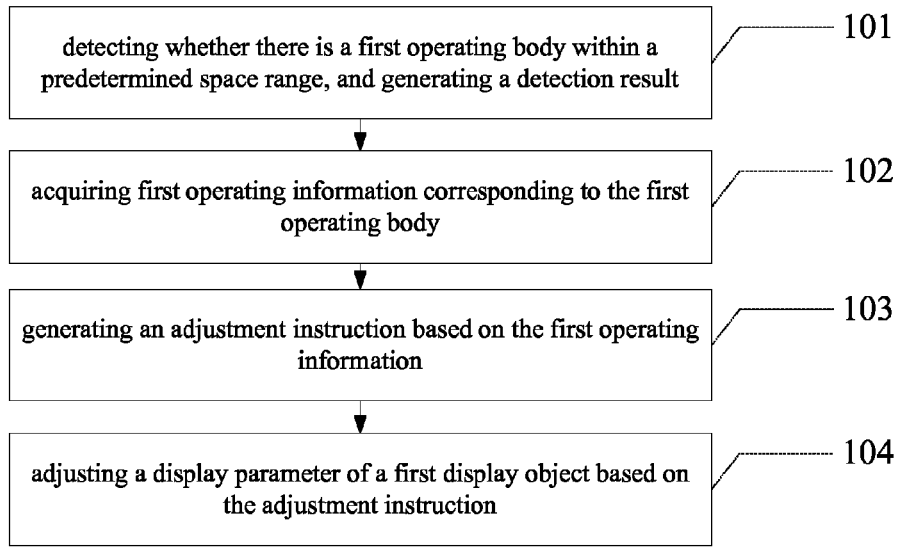
FIG. 1 is a flow chart of an information processing method according to an embodiment of the disclosure.

FIG. 1 is a flow chart of an information processing method according to an embodiment of the disclosure. The method includes steps 101-104.

Step 101, detecting whether there is a first operating body within a predetermined space range, and generating a detection result.

The electronic device includes a display unit. The display unit may be a touch control display unit. In the prior art when a display object such as a window is displayed on one side of the display unit of the electronic device, if the user moves to another side of the display unit and this window is required to be displayed in the position corresponding to the user's location, the user needs to move the display window by a touch operation, or the user can not move the display window at all, thereby leading to the technical problem in the prior art that the electronic device can not adjust the display parameters of the display object according to the position of the operating body above the display unit but can only adjust the display parameters of the display object by user's touch operations.

In the embodiments of the disclosure, the electronic device is provided with a detection unit. The detection unit can detect an operating body having a distance from a surface of the display unit within a predetermined space range, that is, the detection unit in the electronic device can detect an operating body above the display unit, and the operating body needs not to contact the display unit. Briefly, the detection range of this detection unit is a space range, thus this detection unit can detect whether there is a first operating body within a preset space, and generate a corresponding detection result.

For example, a detection unit is included in a large screen computer and the detection unit may be a self-capacitance detection apparatus. The self-capacitance detection apparatus can detect an operating body within 5 cm above the display unit. Therefore, when an operating body is located within the detection range of the self-capacitance detection apparatus, the self-capacitance detection apparatus can detect the operating body within the detection range, and generate a detection result.

If the obtained detection result indicates that a first operating body is detected by the detection unit, the electronic device performs step 102 based on this detection result. If this detection result indicates that there is no first operating body within the detection range of the detection unit, the detection apparatus continues to perform step 101.

Step 102, acquiring first operating information corresponding to the first operating body.

Step 103, generating an adjustment instruction based on the first operating information.

Step 104, adjusting a display parameter of a first display object based on the adjustment instruction.

In step 102, if the detection apparatus in the electronic device detects the first operating body, the electronic device acquires the first operating information of the first operating body by the detection apparatus. For the electronic device, the first operating information is position information of the first operating body with respect to the display unit, or motion track parameter information of the first operating body with respect to the display unit.

Briefly, there are two cases of the first operating body with respect to the display unit, in one case, the first operating body is in a static state with respect to the display unit, and in the other case, the first operating body is in a motion state with respect to the display unit.

In a case that the first operating body is in a motion state with respect to the display unit, the electronic device acquires the motion track parameter information of the operating body from the first operating information by analyzing the first operating information. The electronic device then determines a motion direction of the operating body based on the motion track parameter information of the operating body, and determines a first display object as an object to be adjusted in the motion direction based on the motion direction. After the first display object is determined, display brightness and display size of the first display object is adjusted accordingly, so that the user can clearly judge whether the display object is selected. After the first display object is determined, the self-capacitance detection apparatus in the electronic device further detects and acquires first start position information and first final position information of the first operating body with respect to the display unit.

Figure 2:
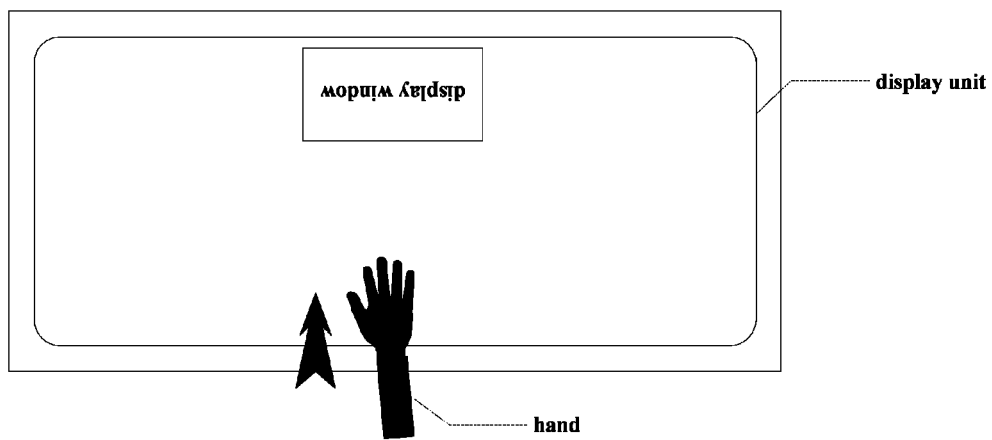
FIG. 2 is a schematic diagram illustrating that a hand moves with respect to the display unit according to an embodiment of the disclosure.

A motion track of an operating body as shown in FIG. 2 is taken as an example. FIG. 2 is a schematic diagram illustrating that a user operates on a large screen electronic device by a hand. When the user' hand moves from the outside of the display unit to the inside of the display unit and the user's hand is within a detection range of the self-capacitance detection apparatus in the electronic device, the self-capacitance detection apparatus in the electronic device detects operating information of the user's hand, that is, detects and acquires start position information of the user's hand, the start position information indicates position information of the user's hand that enters into the display unit and is stored in the electronic device. After the start position information is acquired, the electronic device further acquires final position information of the user's hand on the electronic device. In detecting the final position information, the electronic device firstly judges whether the user's hand is in a static state with respect to the display unit, that is, the electronic device judges whether the user's hand is stopped. In the embodiment of the disclosure, it is determined whether the user's hand is stopped by judging the stop time of the user' hand.

When it is determined that the user's hand is stopped, the electronic device detects a projection position of the user's hand on the display unit by a self-capacitance detection apparatus, thereby determining the position as a first final position of the user's hand.

After the electronic device acquires the first start position information, the first final position information and the first display object, the electronic device generates a corresponding adjustment instruction, which is used to adjust the first display object from a current first display position to a second display position which is different from the current display position and/or adjust the first display object from a first display state to a second display state.

Figure 4:
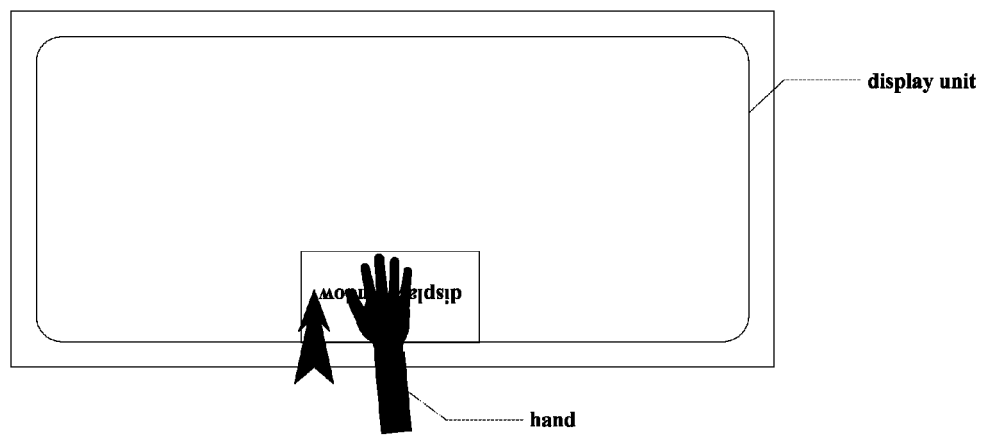
FIG. 4 is a schematic diagram of display window adjustment according to an embodiment of the disclosure.

Specifically, the electronic device determines a display position of the first display object based on the first final position information, that is, the first final position can be used to determine the edge of the display unit corresponding to the operating body. The electronic device then determines the position corresponding to the edge to which the first display unit is adjusted. For example, as shown in FIG. 4, if the electronic device detects that the user's hand is in a lower right corner of the display unit by using the self-capacitance detection apparatus, the electronic device determines the position where the user's hand is located, and then adjusts the display window from a first display position of an upper left corner (as shown in FIG. 2) to a second display position of a lower right corner (as shown in FIG. 4).

Figure 5:
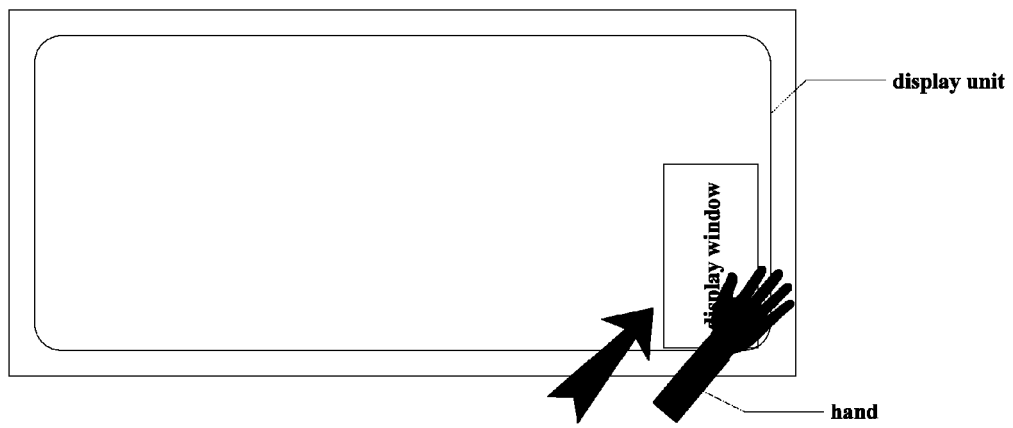
FIG. 5 is a schematic diagram of another display window adjustment according to an embodiment of the disclosure.

In another embodiment, the start position of the user's hand is at a first display edge of the display unit, and the final position of the hand is at a second display edge (as shown in FIG. 5), therefore, the electronic device adjusts the display window from an upper left corner to a position corresponding to the left edge, as the position shown in FIG. 5.

Figure 6:
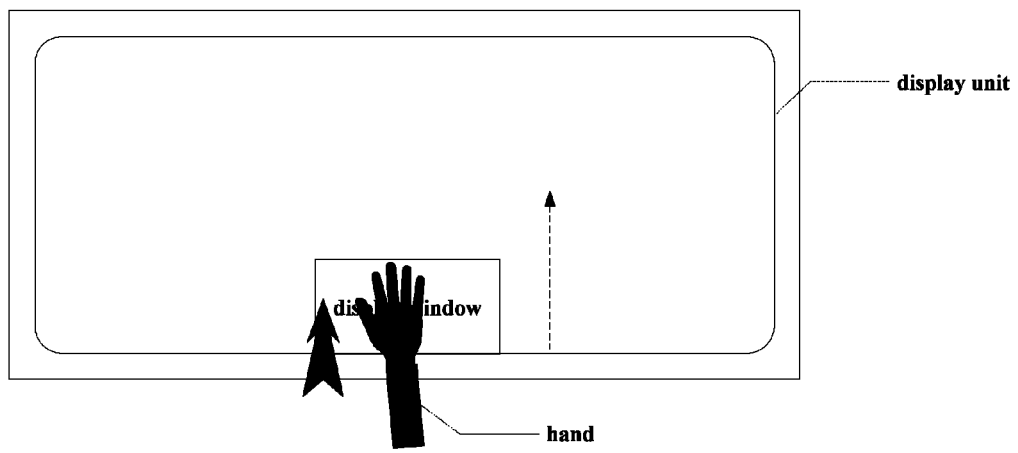
FIG. 6 is a schematic diagram of direction adjustment of a display window according to an embodiment of the disclosure.

In FIG. 2, when the display window is displayed on an upper left corner of the display unit, the display direction of the display window is a direction from the center of the display unit to a distal end of the operating body. However, when the electronic device detects that the start position of the user is a proximal end edge of the operating body, the electronic device firstly determines a first display edge, i.e., a proximal end which is closer to the operating body, based on the start position information, in this case, the direction which is perpendicular to the first display edge and points to a center of the display unit is a first positive display direction. Therefore, after the first positive display direction is determined, the electronic device adjusts the display window from a display orientation shown in FIG. 4 to a display orientation shown in FIG. 6, specifically, the display window is directly rotated by 90 degrees with the center of the display window as a center, so that the display orientation shown in FIG. 6 may be directly acquired, and this orientation is a positive display direction for the user.

When the user's hand moves to other side of the display unit, the electronic device performs similar operation, i.e., rotates the display window accordingly, so that the display window is accurately positioned to the orientation of the user's positive visual angle, thereby facilitating the user's operation and improving the display effect of the electronic device.

In a case that the first operating body is in a static state with respect to the display unit, the electronic device directly acquires second start position information and second final position information of the first operating body. After the second start position information and the second final position information are acquired, the electronic device acquires a position connection line between the second start position and the second final position, and acquires a display edge corresponding to the operating body based on the second start position. The projection image of the first operating body on the display unit intersects with the display edge, and the projection image of the first operating body on the display unit coincides with the position connection line. Therefore, an included angle between the operating body and the display edge may be acquired by the display edge and the position connection line, then the electronic device may determine pointing information of the operating body with respect to the display unit based on the included angle, thus a first display image to be adjusted may be determined in the direction corresponding to the pointing information based on the pointing information. When there is only one display object on the display unit, the electronic device directly determines the display object as the first display object to be adjusted.

Figure 3:
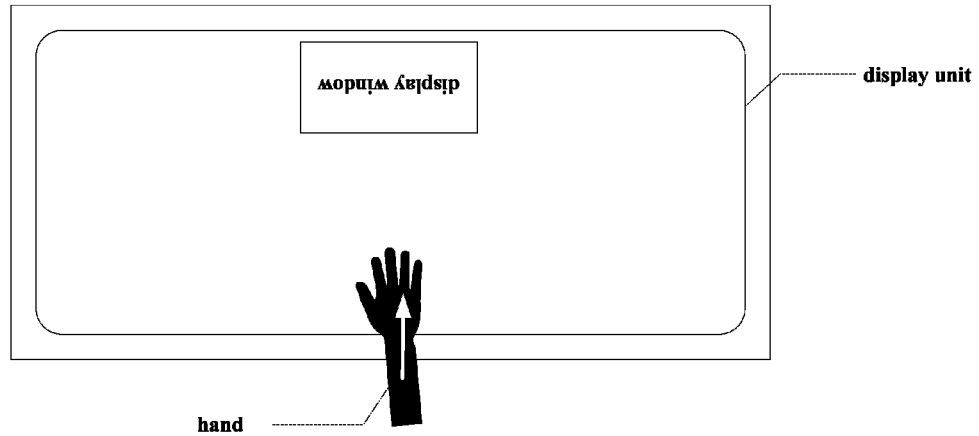
FIG. 3 is a schematic diagram illustrating that a hand is static with respect to the display unit according to an embodiment of the disclosure.

For example, as shown in FIG. 3, when the user' hand moves from the above of the display unit to the detection range of the self-capacitance detection apparatus, the electronic device directly determines the start position and the final position of the user's hand by the self-capacitance detection apparatus, where the start position is a position of the user's hand nearest to the display edge and the final position is a position of the user's hand furthest from the display edge. The electronic device then acquires the position connection line between the start position and the final position based on the start position and the final position, and the direction from the start position to the final position of the position connection line is a direction in which the display object is determined, that is, the electronic device determines the display object to be adjusted in this direction, specifically, in FIG. 3, the display window in this direction is the object to be adjusted.

After the electronic device acquires the second start position, the second final position and the first display object to be adjusted, the electronic device adjusts the first display object from a first display position to a second display position based on the second final position. For example, in FIG. 3, the display window is displayed at an upper left corner of the display unit, and the final position detected by the electronic device is at a lower right corner of the display unit, therefore, the electronic device adjusts the display window from the upper left corner to the lower right corner, i.e., from the position shown in FIG. 3 to the position shown in FIG. 4.

The electronic device then determines the display direction based on the second start position in a similar way as the above embodiments, and the description of which is omitted herein. The final adjustment result is that the display window is adjusted from the display direction shown in FIG. 4 to the display direction shown in FIG. 6.

In addition, in an embodiment of the disclosure, for both the motion and/or static state of the operating body with respect to the display unit, the display direction of the first display object may be adjusted at the same time as the display position of the first display object is adjusted. That is, in the embodiment of the disclosure, the electronic device may firstly determine the display position and the display direction to be adjusted based on the start position and the final position of the operating body, and after the display position and display direction are determined, the electronic device adjusts the display direction and the display position of the first display object at the same time. The manner for adjusting the display position and the display direction have been described in above embodiments, and the description thereof is omitted herein.

In addition, in an embodiment of the disclosure, the electronic device may determine the position that the display object is to be adjusted to by detecting a stretching direction of the operating body with respect to the display unit, and the specific solution of the embodiment is as follows.

Figure 7:
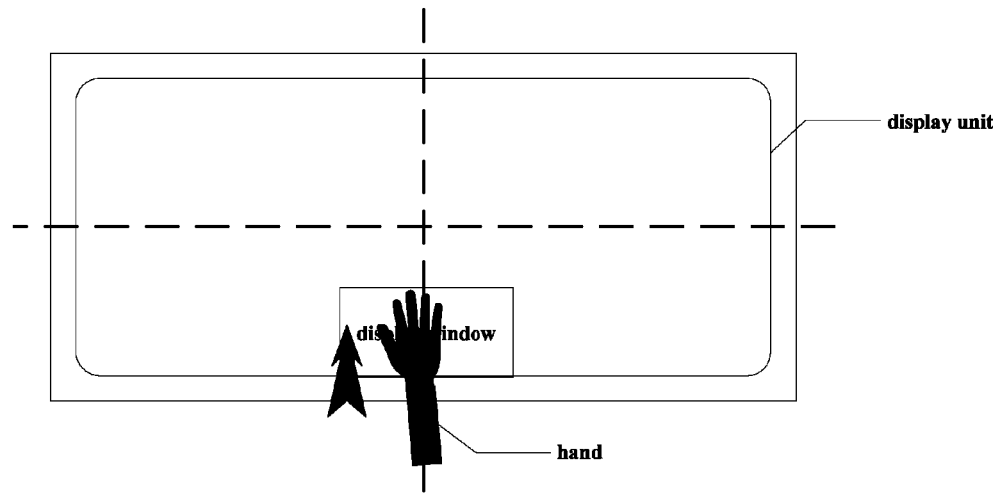
FIG. 7 is a schematic diagram of yet another display window adjustment according to an embodiment of the disclosure.

In the embodiment of the disclosure, the display unit is firstly divided into multiple directions, for example, the display unit is divided into four directions, and the angle occupied by each direction is 90 degrees, as shown in FIG. 7. When the hand is stretched into the display unit in a direction perpendicular to the display edge of the display unit, the electronic device collects motion track images of the user's hand, and determines the motion direction of the user's hand based on the motion track images. In FIG. 7, the electronic device determines the direction of the user's hand with respect to the display unit and determines an edge of the display unit corresponding to this direction based on this direction, thus the electronic device adjusts the display window from a first display position to a second display window based on the determined edge.

The electronic device may set an error range. For example, the error range may be controlled within a range from minus 3 degrees to plus 3 degrees. Therefore, if the angle error of the user's hand with respect to the edge of the display unit is within a preset range, the electronic device still determines that the user's hand is stretched perpendicularly with respect to the display unit.

In addition, in an embodiment of the disclosure, the electronic device may set a preset angle of 30 degrees, that is, the electronic device is equally divided into 9 parts with respect to the center of the display unit, and each divided part is 30 degrees, so a position where the user's hand is stretched into the display unit may be more precisely determined, and a position where the user's hand is located is more accurately determined, then the display window on the display unit is adjusted based on the position where the hand is located.

In the embodiments of the disclosure, the operating body within a preset range above the electronic device is detected by using a self-capacitance detection apparatus, that is, the operating body needs not to contact the electronic device, and the electronic device acquires position information of the operating body with respect to the display unit to determine a display object to be adjusted, and then adjusts the display position and the display direction of the display object based on the position information. Therefore, it is solved the technical problem in the prior art that the electronic device can not adjust the display parameters of the display objects according to the position of an operating body above the display unit, but can only adjust the display parameters of the display objects by user's touch operations. The electronic device can adjust the position of the display object by sensing the operating body above the electronic device, which provides additional adjusting modes for the display object of the electronic device, simplifies processing of the display object of the electronic device and user's operation, enables the user to operate more conveniently and improves user's experience.

In addition, in the embodiment of the disclosure, in addition to detecting an operating body by using a self-capacitance detection apparatus, an image collection apparatus may be used to detect an operating body. An image collection apparatus is provided in or connected with the electronic device, and the image collection apparatus can detect an operating body within a preset range, to acquire first operating images that include the first operating body.

The electronic device then analyzes the first operating images to obtain start position information and final position information of the operating body with respect to the display unit. The analysis process includes determining the coordinates of the image, converting the determined image coordinates into display coordinates on the display unit, to acquire the start position and the final position of the operating body with respect to the display unit.

After the start position and the final position are acquired, the electronic device determines the display object, moves the display object and adjusts the direction of the display object in a manner that is the same as the manner in the above embodiments, and the description thereof is omitted herein.

In addition, in the embodiment of the disclosure, in determining the second position and the display direction of the display object to be adjusted, the electronic device determines N temporary display positions based on the display distance between the first position where the display object is currently displayed and a second position determined by the operating body, where N is a positive integer greater than or equal to 1. The electronic device then displays the first display object from the first display position to the second display position step by step by the N temporary display positions, and rotates the first display object gradually while adjusting the position. If the first display object is required to be rotated by 90 degrees, the image may be rotated by 10 degrees each time during the adjustment, therefore, an animation display effect is achieved when the display object is adjusted, and user's experience is improved.

In an embodiment of the disclosure, images of the operating body are collected by an image collection unit, that is, the operating body needs not to contact the electronic device, and electronic device acquires the start position and the final position of the operating body on the display unit by analyzing the collected images of the operating body. Therefore, it is solved the technical problem in the prior art that the electronic device can not adjust the display parameters of the display objects according to the position of the operating body above the display unit, but can only adjust the display parameters of the display objects by user's touch operations. The electronic device can adjust the position of the display object by sensing the operating body above the electronic device, which provides additional adjusting modes for the display object of the electronic device, simplifies processing of the display object of the electronic device and user's operation, enables the user to operate more conveniently and improves user's experience.

Figure 8:
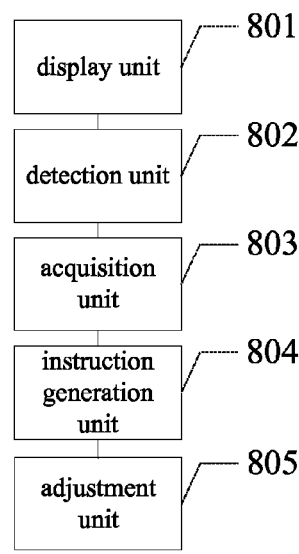
FIG. 8 is a schematic structural diagram of an electronic device according to an embodiment of the disclosure.

Corresponding to the information processing method of the disclosure, an electronic device is further provided by an embodiment of the disclosure. FIG. 8 is a schematic structural diagram of an electronic device according to an embodiment of the disclosure, and the electronic device includes:

a display unit 801, adapted to display at least one display object;

a detection unit 802, adapted to detect, when at least a first display object is displayed on the display unit, whether there is a first operating body within a predetermined space range, and generate a detection result;

an acquisition unit 803, adapted to acquire first operating information corresponding to the first operating body if the detection result indicates that there is the first operating body within the predetermined space range;

an instruction generation unit 804, adapted to generate an adjustment instruction based on the first operating information; and an adjustment unit 805, adapted to adjust a display parameter of the first display object based on the adjustment instruction.

The adjustment unit 805 is adapted to adjust the first display object from a current first display position to a second display position which is different from the first display position based on the adjustment instruction; and/or adjust the first display object from a first display state to a second display state based on the adjustment instruction.

The instruction generation unit 804 includes an analysis module and an instruction generation module. The analysis module is adapted to analyze the first operating information and acquire motion track parameter information of the operating body from the first operating information. The instruction generation module is adapted to generate the adjustment instruction based on the motion track parameter information of the operating body.

The electronic device further includes a direction determination unit and a display object determination unit. The direction determination unit is adapted to determine a motion direction of the operating body based on the motion track parameter information of the operating body. The display object determination unit is adapted to determine the first display object in the motion direction as an object to be adjusted based on the motion direction.

After the direction determination unit determines the motion direction of the operating body and the display object determination unit determines the display object, the adjustment unit 805 in the electronic device includes:

a first acquisition module, adapted to acquire, from the motion track parameter information of the operating body, first start position information which indicates motion of the operating body;

a judgment module, adapted to judge whether first final position information satisfies a preset condition and generate a judgment result;

a first determination module, adapted to determine a projection position of the first final position on the display unit as a second display position if the judgment result indicates that the first final position information satisfies the preset condition;

a first adjustment module, adapted to adjust the first display object from the current first display position to the second display position which is different from the first display position based on the second display position; and/or a second acquisition module, adapted to acquire, from the motion track parameter information of the operating body, first start position information which indicates motion of the operating body;

a second determination module, adapted to determine a first display edge of the display unit corresponding to the operating body based on the first start position information; and a second adjustment module, adapted to adjust the first display object from the first display state to the second display state based on the first display edge.

The first acquisition module and the second acquisition module may be the same processing module, and the first determination module and the second determination module may be the same processing module.

There are following technical effects or advantages provided by the one or more embodiments of the disclosure.

In the embodiments of the disclosure, the operating body within a preset range above the electronic device is detected by using a self-capacitance detection apparatus, that is, the operating body needs not to contact the electronic device, and the electronic device acquires position information of the operating body with respect to the display unit to determine the display object to be adjusted, and then adjusts the display position and the display direction of the display object based on the position information. Therefore, it is solved the technical problem in the prior art that the electronic device can not adjust the display parameters of the display objects according to the position of the operating body above the display unit, but can only adjust the display parameters of the display objects by user's touch operations. The electronic device can adjust the position of the display object by sensing the operating body above the electronic device, which provides additional adjusting modes for the display object of the electronic device, simplifies processing of the display object of the electronic device and user's operation, enables the user to operate more conveniently and improves user's experience.

It should be understood by those skilled in the art that the embodiments of the disclosure may be provided as a method, a system or a computer program product. Therefore, the disclosure may be implemented in a form of an entire hardware embodiment, an entire software embodiment or an embodiment combining the hardware and the software. Moreover, the disclosure may implemented in a form of a computer program product executed on one or more computer readable storage medium (including but not limited to a disk storage, a CD-ROM and an optical storage) including computer readable program codes.

The disclosure is described by referring to flow charts and/or block diagrams of a method, a device (system) and a computer program product according to the embodiments of the disclosure. It should be understood that, each flow and/or block in the flow charts and/or block diagrams and combination of flows and/or blocks in the flow charts and/or block diagrams may be implemented by computer program instructions. These computer program instructions may be provided for a general purpose computer, a dedicated computer, an embedded processor or processors of other programmable data processing devices, to produce a machine, such that apparatuses for implementing functions specified in one or more flows of the flow charts and/or one or more blocks of the block diagrams is produced by the instructions executed by a computer or processes of other programmable data processing devices.

These computer program instructions may be stored in a computer readable storage which can conduct a computer or other programmable data processing devices to operate in a special manner, such that the instructions stored in the computer readable storage produce an article including instruction apparatuses, and the instruction apparatuses implement functions specified in one or more flows of the flow charts and/or one or more blocks of the block diagrams.

These computer program instructions may be loaded into a computer or other programmable data processing devices, such that a series of operating steps are performed on the computer or other programmable data processing devices to produce a processing implemented by a computer, thus the instructions executed on the computer or other programmable devices are provided to implement the steps of functions specified in one or more flows of the flow charts and/or one or more blocks of the block diagrams.

Various modifications and variations may be made to the disclosure by those skilled in the art without departing from the spirit and the scope of the disclosure. In this way, if these modifications and variations of the disclosure are within the scope of the claims of the disclosure and equivalents thereof, the disclosure also intends to include these modifications and variations.

The invention claimed is:

1. An information processing method, which is applied to an electronic device, the electronic device comprising a display unit and a detection unit, and the detection unit being adapted to detect at least an operating body which has a distance from a surface of the display unit within a predetermined space range, wherein the method comprises:
   detecting, when at least a first display object is displayed on the display unit, whether there is a first operating body having the distance from the surface of the display unit within the predetermined space range, and generating a detection result;
   acquiring first operating information corresponding to the first operating body if the detection result indicates that the first operating body is within the predetermined space range;
   generating an adjustment instruction based on the first operating information; and
   adjusting a display parameter of the first display object based on the adjustment instruction,
   wherein generating the adjustment instruction based on the first operating information comprises:
      analyzing the first operating information and acquiring motion track parameter information of the first operating body from the first operating information; and
      generating the adjustment instruction based on the motion track parameter information of the first operating body.

2. The method according to claim 1, wherein adjusting the display parameter of the first display object based on the adjustment instruction comprises:
   adjusting the first display object from a current first display position to a second display position which is different from the current first display position based on the adjustment instruction; and/or
   adjusting the first display object from a first display state to a second display state based on the adjustment instruction.

3. The method according to claim 2, further comprising:
   before generating the adjustment instruction based on the motion track parameter information of the first operating body,
      determining a motion direction of the first operating body based on the motion track parameter information of the first operating body; and
      determining the first display object in the motion direction as an object to be adjusted based on the motion direction.

4. The method according to claim 3, wherein adjusting the first display object from the current first display position to the second display position which is different from the current first display position based on the adjustment instruction comprises:
   acquiring, from the motion track parameter information of the first operating body, first start position information which indicates motion of the first operating body;
   judging whether first final position information satisfies a preset condition, and generating a judgment result;
   determining a projection position of the first final position information on the display unit as the second display position if the judgment result indicates that the first final position information satisfies the preset condition; and
   adjusting the first display object from the current first display position to the second display position which is different from the current first display position based on the second display position,
   and/or,
   the adjusting the first display object from a first display state to a second display state based on the adjustment instruction comprises:
   acquiring, from the motion track parameter information of the first operating body, first start position information which indicates motion of the first operating body;
   determining a first display edge of the display unit corresponding to the first operating body based on the first start position information; and
   adjusting the first display object from the first display state to the second display state based on the first display edge.

5. The method according to claim 4, wherein adjusting the first display object from the first display state to the second display state based on the first display edge comprises:
   determining, based on the first display edge, a direction which is perpendicular to the first display edge and points to a center of the display unit as a first positive display direction; and
   adjusting the first display object from a current display direction to the first positive display direction based on the first positive display direction.

6. The method according to claim 2, wherein adjusting the first display object from the current first display position to the second display position which is different from the current first display position comprises:
   determining a display distance between the current first display position and the second display position;
   determining N temporary display positions in the display distance based on a preset rule, wherein N is a positive integer greater than or equal to 1; and
   displaying the first display object from the current first display position to the second display position step by step according to the N temporary display positions.

7. The method according to claim 1, further comprising:
   before generating the adjustment instruction based on the motion track parameter information of the first operating body,
      determining a motion direction of the first operating body based on the motion track parameter information of the first operating body; and determining the first display object in the motion direction as an object to be adjusted based on the motion direction.

8. The method according to claim 2, further comprising:
before generating the adjustment instruction based on the first operating information,
  analyzing the first operating information, and acquiring static position information of the first operating body from the first operating information;
  acquiring second start position information and second final position information of the first operating body based on the static position information;
  acquiring an included angle between the first operating body and an edge of the display unit by analyzing based on the second start position information and the second final position information;
  determining pointing information of the first operating body with respect to the display unit based on the included angle; and
  determining the first display object on the display unit based on the pointing information.

9. The method according to claim 8,
wherein adjusting the first display object from the current first display position to the second display position which is different from the current first display position based on the adjustment instruction comprises:
  determining a projection position of the second final position information on the display unit as the second display position based on the second final position information; and
  adjusting the first display object from the current first display position to the second display position which is different from the current first display position based on the second display position,
and/or wherein adjusting the first display object from the first display state to the second display state based on the adjustment instruction comprises:
  determining a second display edge of the display unit corresponding to the first operating body based on the second start position information; and
  adjusting the first display object from the first display state to the second display state based on the second display edge.

10. The method according to claim 9, wherein adjusting the first display object from the first display state to the second display state based on the second display edge comprises:
  determining, based on the second display edge, a direction which is perpendicular to the second display edge and points to a center of the display unit as a second positive display direction; and
  adjusting the first display object from a current display direction to the second positive display direction based on the second positive display direction.

11. The method according to claim 1, further comprising:
before generating the adjustment instruction based on the first operating information,
  analyzing the first operating information, and acquiring static position information of the first operating body from the first operating information;
  acquiring second start position information and second final position information of the first operating body based on the static position information;
  acquiring an included angle between the first operating body and an edge of the display unit by analyzing based on the second start position information and the second final position information;
  determining pointing information of the first operating body with respect to the display unit based on the included angle; and
  determining the first display object on the display unit based on the pointing information.

12. An electronic device, comprising:
  a display unit, adapted to display at least one display object;
  a detection unit, adapted to detect, when at least a first display object is displayed on the display unit, whether there is a first operating body having a distance from a surface of the display unit within a predetermined space range, and generate a detection result;
  an acquisition unit, adapted to acquire first operating information corresponding to the first operating body if the detection result indicates that the first operating body is within the predetermined space range;
  an instruction generation unit, adapted to generate an adjustment instruction based on the first operating information; and
  an adjustment unit, adapted to adjust a display parameter of the first display object based on the adjustment instruction;
  wherein the instruction generation unit comprises:
    an analysis module, adapted to analyze the first operating information and acquire motion track parameter information of the first operating body from the first operating information; and
    an instruction generation module, adapted to generate the adjustment instruction based on the motion track parameter information of the first operating body.

13. The electronic device according to claim 12, wherein, the adjustment unit is adapted to adjust the first display object from a current first display position to a second display position which is different from the current first display position based on the adjustment instruction; and/or adjust the first display object from a first display state to a second display state based on the adjustment instruction.

14. The electronic device according to claim 12, wherein the electronic device further comprises:
  a direction determination unit, adapted to determine a motion direction of the first operating body based on the motion track parameter information of the first operating body; and
  a display object determination unit, adapted to determine the first display object in the motion direction as an object to be adjusted based on the motion direction.

15. The electronic device according to claim 14,
wherein the adjustment unit comprises:
  a first acquisition module, adapted to acquire, from the motion track parameter information of the first operating body, first start position information which indicates motion of the first operating body;
  a judgment module, adapted to judge whether first final position information satisfies a preset condition and generate a judgment result;
  a first determination module, adapted to determine a projection position of the first final position information on the display unit as a second display position if the judgment result indicates that the first final position information satisfies the preset condition; and
  a first adjustment module, adapted to adjust the first display object from a current first display position to the second display position which is different from the current first display position based on the second display position,
and/or wherein the adjustment unit comprises:

a second acquisition module, adapted to acquire, from the motion track parameter information of the first operating body, first start position information which indicates motion of the first operating body;

a second determination module, adapted to determine a first display edge of the display unit corresponding to the first operating body based on the first start position information; and a second adjustment module, adapted to adjust the first display object from a first display state to a second display state based on the first display edge.

* * * * *